(12) United States Patent
Stumphauzer, II et al.

(10) Patent No.: US 9,151,624 B2
(45) Date of Patent: Oct. 6, 2015

(54) DATA SERVICES VIA RECEIVERS INDEPENDENT OF NAVIGATION SYSTEMS

(75) Inventors: William Carl Stumphauzer, II, South Lyon, MI (US); John Dombrowski, Willis, MI (US); Sven Finnis, Crownsville, MD (US); Leslie French, Princeton, NJ (US); Craig Correa, Gaithersburg, MD (US); Naresh Coppisetti, Pennington, NJ (US)

(73) Assignee: Sirius XM Radio Inc., New York, NY (US)

( * ) Notice: Subject to any disclaimer, the term of this patent is extended or adjusted under 35 U.S.C. 154(b) by 0 days.

(21) Appl. No.: 12/772,603

(22) Filed: May 3, 2010

(65) Prior Publication Data

US 2010/0317365 A1    Dec. 16, 2010

Related U.S. Application Data

(60) Provisional application No. 61/174,954, filed on May 1, 2009.

(51) Int. Cl.
*H04L 29/06* (2006.01)
*H04W 64/00* (2009.01)
*G01C 21/26* (2006.01)

(52) U.S. Cl.
CPC ...................................... *G01C 21/26* (2013.01)

(58) Field of Classification Search
USPC .......... 455/414.3, 403, 456.1, 456.6; 370/338
See application file for complete search history.

(56) References Cited

U.S. PATENT DOCUMENTS

| | | | |
|---|---|---|---|
| 6,339,745 B1 * | 1/2002 | Novik | 701/208 |
| 6,785,551 B1 * | 8/2004 | Richard | 455/456.1 |
| 6,947,703 B2 * | 9/2005 | Ceresoli et al. | 455/3.02 |
| 7,142,608 B2 | 11/2006 | Schulze et al. | |
| 8,160,815 B2 * | 4/2012 | Geelen | 701/410 |
| 2002/0171581 A1 * | 11/2002 | Sheynblat et al. | 342/357.09 |
| 2004/0049389 A1 * | 3/2004 | Marko et al. | 704/260 |
| 2004/0172372 A1 * | 9/2004 | Wells et al. | 705/400 |
| 2005/0020238 A1 * | 1/2005 | Eastman et al. | 455/403 |
| 2005/0221843 A1 * | 10/2005 | Friedman et al. | 455/456.6 |
| 2006/0148400 A1 * | 7/2006 | Farrow | 455/3.02 |

(Continued)

*Primary Examiner* — Jinsong Hu
*Assistant Examiner* — Jean Chang
(74) *Attorney, Agent, or Firm* — Kramer Levin Naftalis & Frankel LLP

(57) ABSTRACT

A system and method for providing a suite of data services in non-navigation based electronic devices such as head units, that can provide similar levels of functionality to navigation-based systems are presented. In exemplary embodiments of the present invention, a non-navigation data system for providing data services in a mobile environment can include a data decoder for decoding a digital data stream from a digital audio radio transmission source, a location determining means for determining a current location of a mobile receiver receiving the digital data stream, a display for displaying data corresponding to the current location, and a plurality of static maps wherein the data corresponding to the current location is overlaid at least over a portion of the static maps. In exemplary embodiments of the present invention, a method of providing a data service in a mobile environment without the need for a navigation system can include decoding a digital data stream from a digital audio radio transmission source, determining a current location of a mobile receiver receiving the digital data stream, displaying data corresponding to the current location, and overlaying the data corresponding to the current location over at least a portion of a plurality of static maps.

19 Claims, 10 Drawing Sheets

(56) References Cited

U.S. PATENT DOCUMENTS

| | | | |
|---|---|---|---|
| 2006/0277565 A1* | 12/2006 | Long et al. | 725/28 |
| 2006/0281401 A1* | 12/2006 | DiBiaso et al. | 455/3.02 |
| 2007/0136086 A1* | 6/2007 | Luerssen | 705/1 |
| 2007/0265744 A1* | 11/2007 | Nicolai | 701/35 |
| 2008/0009239 A1* | 1/2008 | Nguyen et al. | 455/3.02 |
| 2008/0032721 A1* | 2/2008 | MacDonald et al. | 455/466 |
| 2008/0167812 A1* | 7/2008 | Geelen | 701/213 |
| 2009/0265099 A1* | 10/2009 | Gottlieb | 701/208 |
| 2009/0316671 A1* | 12/2009 | Rolf et al. | 370/338 |
| 2010/0049528 A1* | 2/2010 | Zeinstra et al. | 704/275 |
| 2010/0097239 A1* | 4/2010 | Campbell et al. | 340/825.25 |
| 2010/0161090 A1* | 6/2010 | Smolinski et al. | 700/94 |
| 2010/0250369 A1* | 9/2010 | Peterson et al. | 705/14.58 |
| 2010/0280956 A1* | 11/2010 | Chutorash et al. | 705/64 |

* cited by examiner

DATA SERVICES VIA RECEIVERS INDEPENDENT OF NAVIGATION SYSTEMS

CROSS-REFERENCE TO RELATED APPLICATIONS

This application claims priority to U.S. Provisional Patent Application No. 61/174,954, filed on May 1, 2009, which is hereby incorporated herein by reference.

FIELD OF THE INVENTION

The invention relates generally to systems and methods of providing data services in a mobile environment, and in particular without requiring in-vehicle or personal navigation systems to interoperate with.

BACKGROUND OF THE INVENTION

Satellite digital radio broadcasters, such as, for example, Sirius XM Radio Inc. ("Sirius XM"), currently offer well over a hundred channels of content over a large geographic footprint. A portion of that content can include data services that interoperate with existing GPS-based navigation services commonly available for use in automobiles, for example. Such data services can include, for example, traffic data, weather data, etc. For example, Sirius XM has operated real-time traffic data services for premium navigation systems since 2004. These services provide a subscriber with real-time traffic information, enabling a vehicle's navigation system or Personal Navigation Device ("PND") to display constantly refreshed and current traffic conditions. However, for the large portion of the existing and future markets that do not or will not have access to GPS-based navigation systems, these data services are useless.

In a typical satellite radio service configuration of approximately 100 channels or more, nearly 50 channels provide music with the remaining stations offering news, sports, talk and data. For example, the broadcast services provided by Sirius XM Radio Inc. each include a satellite X-band uplink to two or more satellites which provide frequency translation to the S-band for re-transmission to radio receivers on earth within a coverage area. Radio frequency carriers from one of the satellites are also received by terrestrial repeaters. The content received at the repeaters is retransmitted at a different S-band carrier to the same radios that are within their respective coverage areas. These terrestrial repeaters facilitate reliable reception in geographic areas where geosynchronous satellite reception is obscured by tall buildings, hills or other natural obstructions, tunnels, or other obstructions. The signals transmitted by the satellites and the repeaters are received by satellite digital audio radio system ("SDARS") receivers which can be located in automobiles, in handheld units, or in stationary units for home or office use. The SDARS receivers are designed to receive one or both of the satellite signals and the signals from the terrestrial repeaters and dynamically combine or select one of the signals to output to a user.

Each SDARS receiver generally contains a unique Hardware Identification number (HWID), which is assigned during the manufacturing process. The HWID can be used by SDARS Service Providers to enable the receiver to receive, or disable the receiver from receiving, particular subscribed services such as music and talk programming. In addition, these subscribed services can include data services, such as, for example, weather and traffic data feeds or other custom data feeds. Such custom data feeds are typically uniquely enabled by the SDARS Service Provider for select subscriber groups.

Additionally, current navigation services store databases of maps and other data and rely on complicated navigational systems, routing engines, embedded map databases and other resources to provide their information to users, all of which adds complexity and cost.

What is thus needed in the art are systems and methods of providing data services to users in an automotive environment without requiring, or being dependent upon navigation systems

SUMMARY OF THE INVENTION

In exemplary embodiments of the present invention, a suite of data services can be provided for non-navigation based head units that can provide similar levels of functionality to navigation-based systems. A non-navigation data system for providing data services in a mobile environment can include a data decoder for decoding a digital data stream from a digital audio radio transmission source, a location determining means for determining a current location of a mobile receiver receiving the digital data stream, a display for displaying data corresponding to the current location, and a plurality of static maps wherein the data corresponding to the current location is overlaid at least over a portion of the static maps. In exemplary embodiments of the present invention, a method of providing a data service in a mobile environment without the need for a navigation system can include decoding a digital data stream from a digital audio radio transmission source, determining a current location of a mobile receiver receiving the digital data stream, displaying data corresponding to the current location, and overlaying the data corresponding to the current location over at least a portion of a plurality of static maps.

Figure 1:
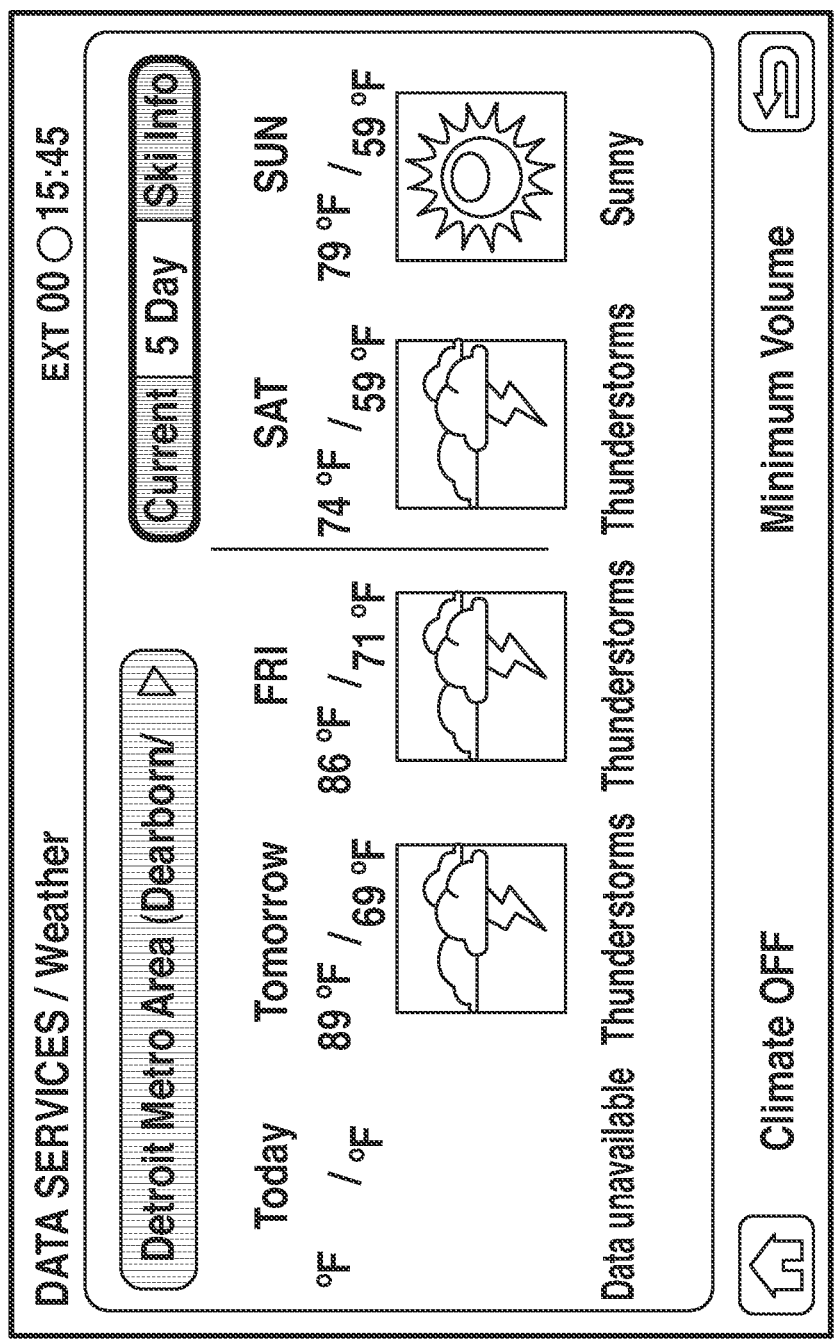
FIG. 1 is a screen shot of tabular weather according to an exemplary embodiment of the present invention.

It is noted that the patent or application file may contain at least one drawing executed in color. If that is the case, copies of this patent or patent application publication with color drawing(s) will be provided by the U.S. Patent and Trademark Office upon request and payment of the necessary fee.

DETAILED DESCRIPTION OF THE INVENTION

Satellite radio operators are providing digital radio broadcast services covering the entire continental United States with the hope of further covering other areas of the Americas. These services offer approximately 100 channels or more, of which nearly 50 channels in a typical configuration provides music with the remaining stations offering news, sports, talk and data channels. Briefly, the service provided by Sirius XM Radio includes a satellite X-band uplink to two satellites which provide frequency translation to the S-band for re-transmission to radio receivers on earth within a coverage area. Radio frequency carriers from one of the satellites are also received by terrestrial repeaters. The content received at the repeaters is retransmitted at a different S-band carrier to the same radios that are within their respective coverage areas. These terrestrial repeaters facilitate reliable reception in geographic areas where Geosynchronous Satellite reception is obscured by tall buildings, hills or other natural obstructions, tunnels, or other obstructions. The signals transmitted by the satellites and the repeaters are received by satellite digital audio radio system (SDARS) receivers which can be located in automobiles, in handheld or in stationary units for home or office use. The SDARS receivers are designed to receive one or both of the satellite signals and the signals from the terrestrial repeaters and combine or select one of the signals as the receiver output.

Each SDARS receiver contains a unique Hardware Identification number (HWID), which is assigned during the manufacturing process and is used by SDARS Service Providers to enable or disable the radio to receive subscribed services, such as music and talk programming. In addition, these subscribed services could include data services, such as weather and traffic data feeds or other custom data feeds. The custom data feeds are typically uniquely enabled by the SDARS Service Provider for select subscriber groups. Although existing telematics systems using cellular and Global Positioning System (GPS) technology such as the On-Star system currently track vehicles and provide services such as dispatching emergency road side assistance upon detection of certain detected events at the vehicle, no existing system graphically provides enhanced data services without providing a navigation system that typically requires additional memory and resources to operate.

In exemplary embodiments of the present invention data services are offered that expand the range of target head units from navigation based systems to non-navigation based systems. In order to deliver a functional suite of data services, the following hardware and system configuration can be assumed: (i) GPS present or a cellular location determining mechanism using time distance of arrival for example or other technique; (ii) nNo on board maps or routing database; (iii) an Alert-C decoder in the head unit to decode the Sirius XM non-navigation traffic messages.

In exemplary embodiments of the present invention the data services can include, for example, the following:
1. Weather—presented as graphical and tabular data. The tabular weather service can be based on an existing data feed, and can, for example, mirror current weather markets;
2. Fuel prices—provide pricing data for x stations y miles from vehicle;
3. Movie times—provide schedule data for x theaters y miles from vehicle; and
4. Sports scores—can be identical, for example, to the Sirius Travel Link® service, described at, for example, the following URL: http://www.fordvehicles.com/assets/modules/sirius/brochures/Travel_Link_Brochure_ford.pdf, which is hereby incorporated herein by reference.

Figure 1A:
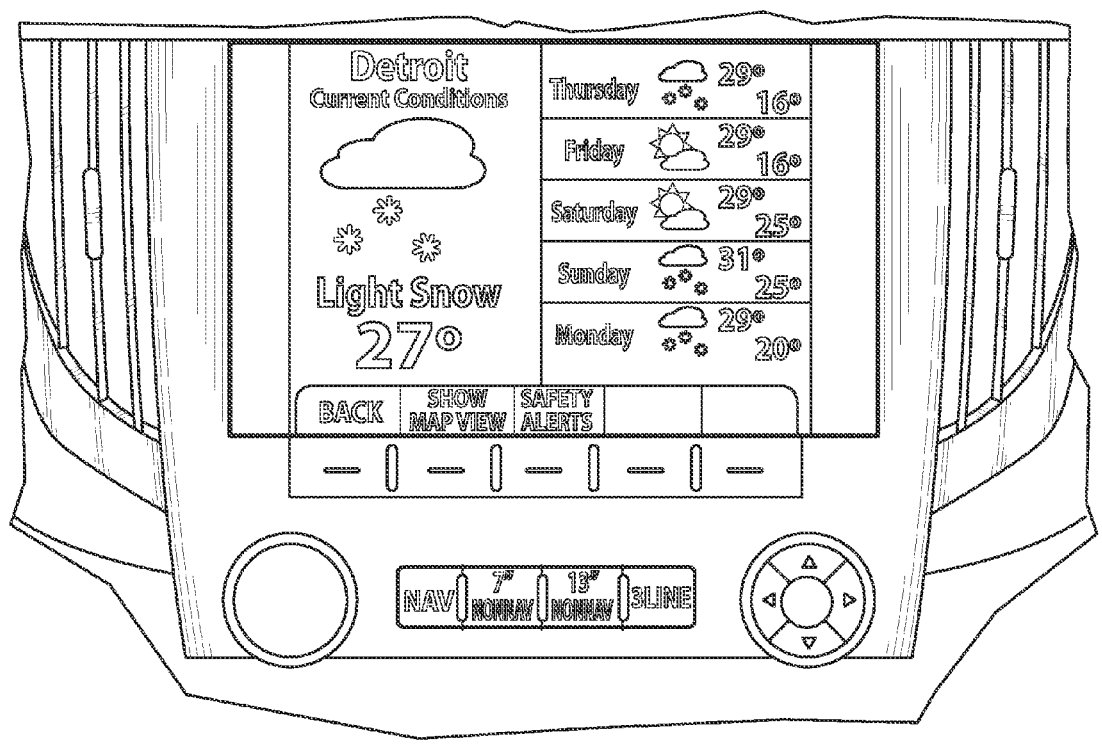
FIG. 1A is a screen shot of an alternative weather data table, showing both current conditions and 5-day forecast according to an exemplary embodiment of the present invention.

In exemplary embodiments of the present invention GPS can be used to present relevant weather data to users, based on the weather market associated with the user's then current location. Additionally, a customer can select an alternate weather market from drop down menu, speech recognition, or other user friendly input method. In exemplary embodiments of the present invention no modification required to the weather data feeds currently used by SDARS providers in connection with in-vehicle navigation systems. Thus, in exemplary embodiments of the present invention, a non-nav tabular weather service can be essentially identical to a navigation system based service FIGS. 1 and 1A depict exemplary screen shots of tabular weather on a non-nav system according to an exemplary embodiment of the present invention. FIG. 1, for example, displays a 5 day forecast for the Detroit area, and FIG. 1A has a combined current weather conditions and 5 day forecast display.

Figure 2:
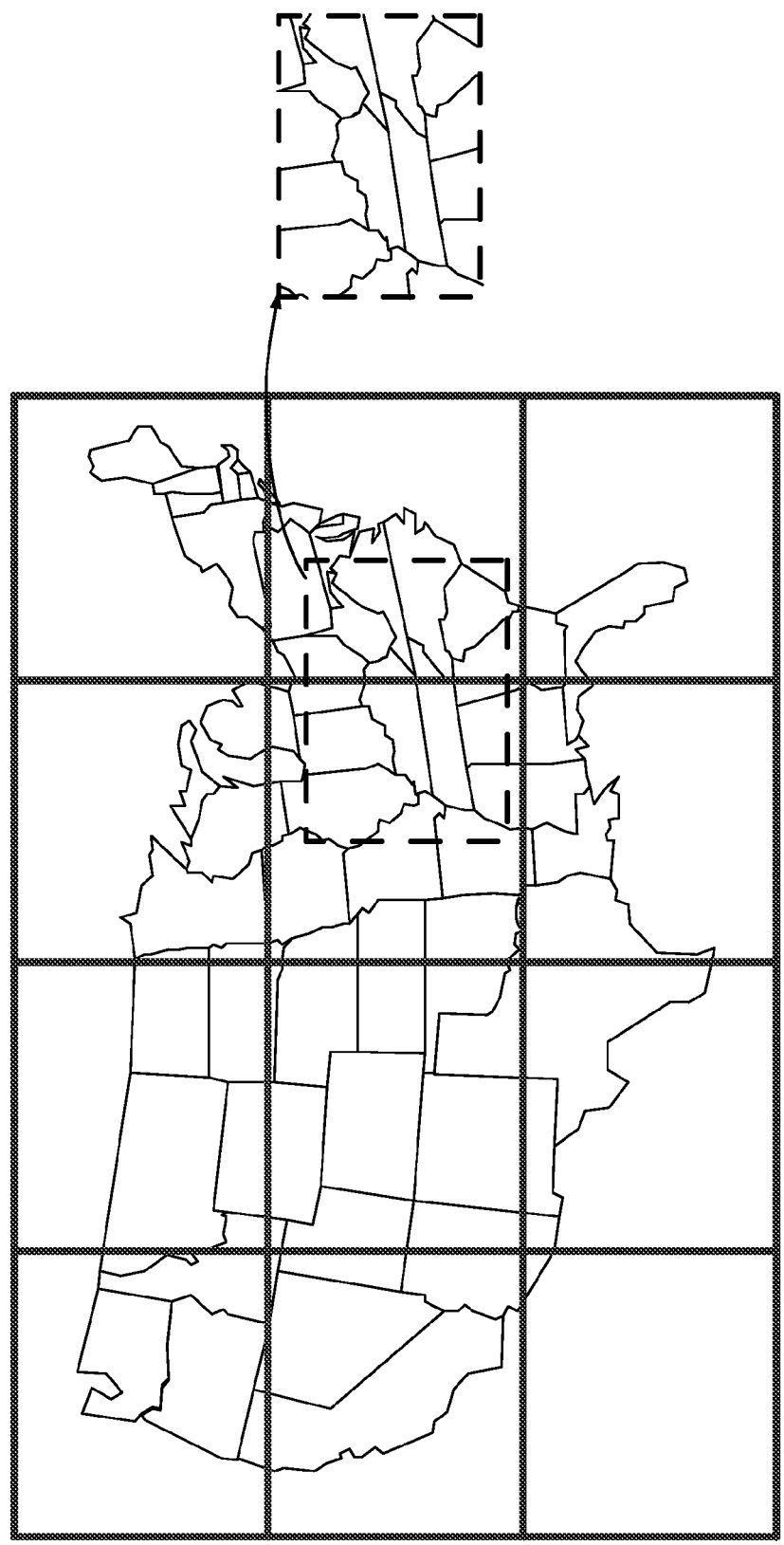
FIG. 2 is screen shot of graphical weather according to an exemplary embodiment of the present invention.
Figure 2A:
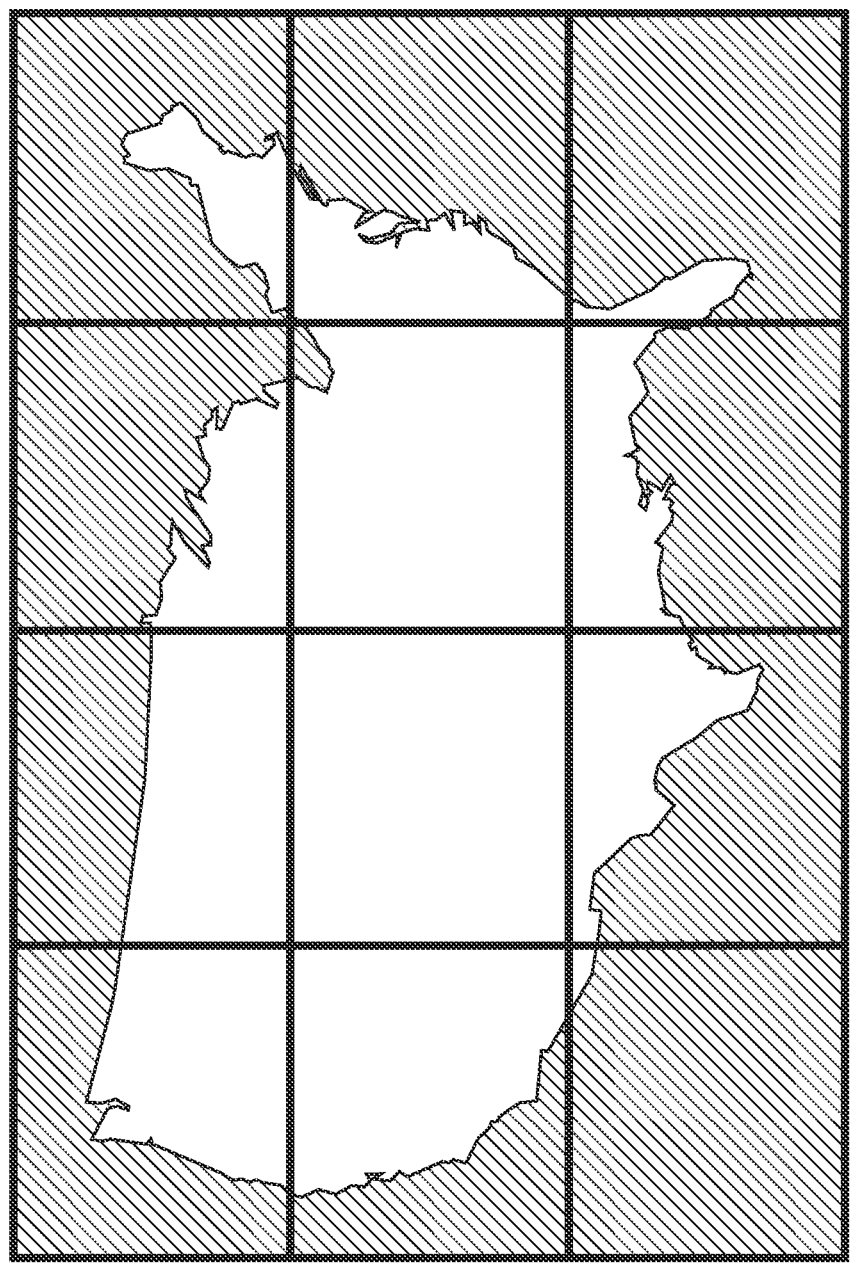
FIG. 2A depicts an alternate tiling scheme of the continental United States according to an alternate exemplary embodiment of the present invention.

FIG. 2 depicts an exemplary screen shot of a graphical weather display according to an exemplary embodiment of the present invention. Such a graphical weather service can be based on existing data feeds used by SDARS providers in connection with navigation-based data services. With reference thereto, a country can be divided into a 16 tile map, matching the WSI tiles, and weather data can be, for example, overlaid onto the map. In exemplary embodiments of the present invention, there can be a option to display a nationwide view of graphical weather. As shown in FIG. 2A, alternatively, a country or area can be divided into a different number of tiles, such as, for example, twelve. In exemplary embodiments of the present invention, up to four tiles of such weather data can be used to display one tile of pertinent weather information.

Figure 3:
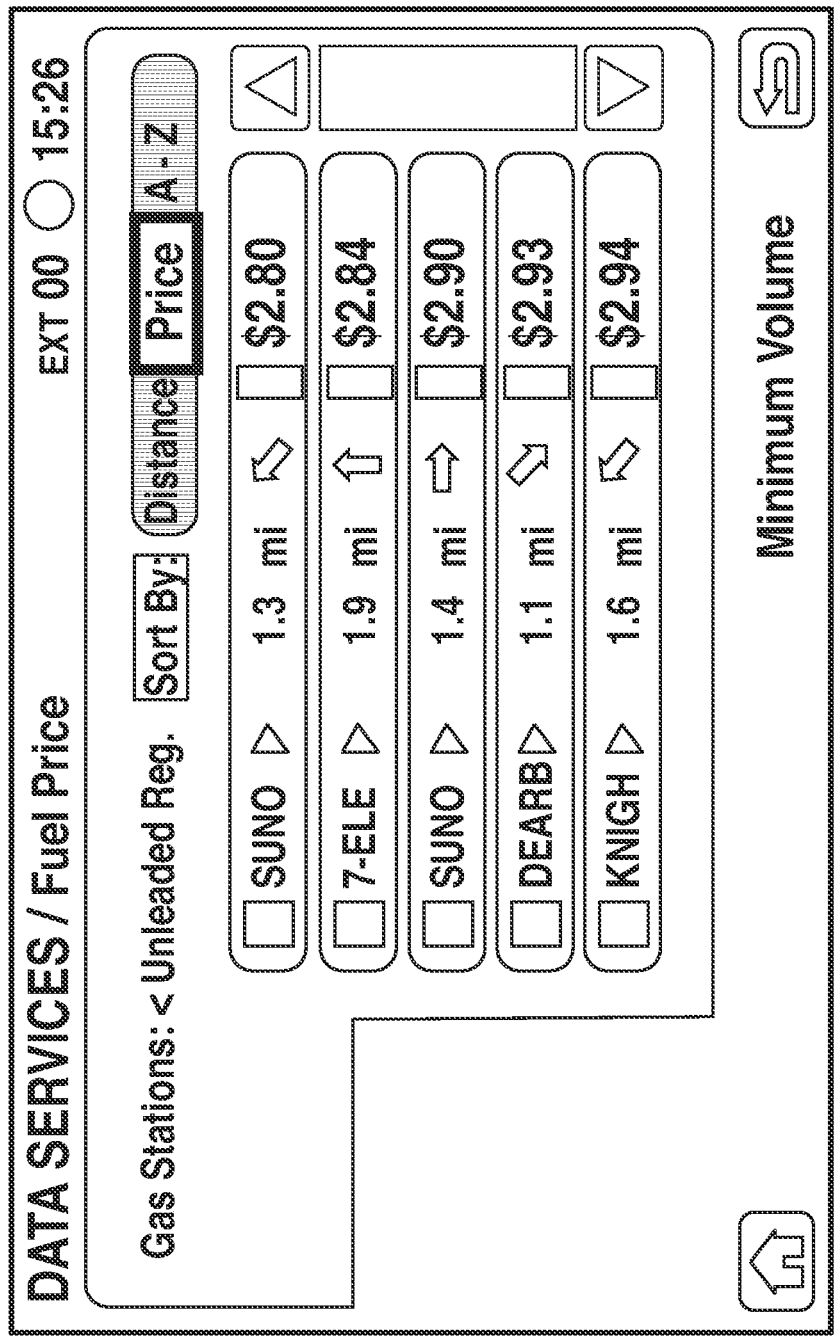
FIG. 3 is a screen shot of fuel prices according to an exemplary embodiment of the present invention.
Figure 3A:
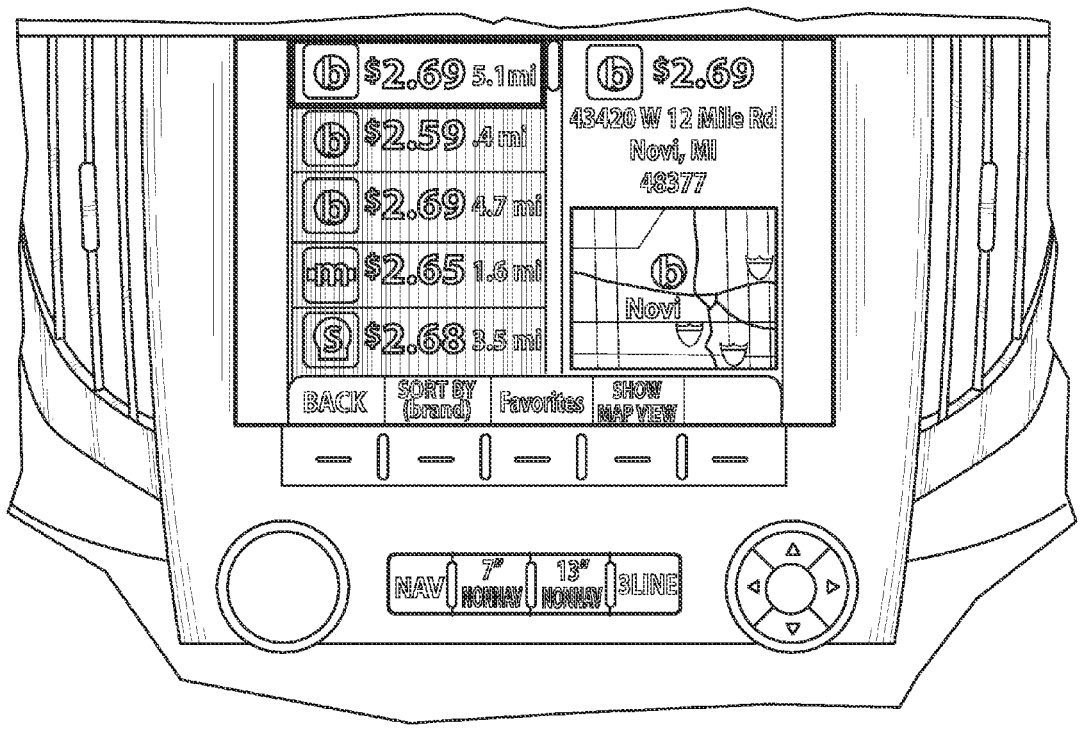
FIG. 3A is a screen shot of an alternative fuel process information screen, showing both oil company logo and relative locations of gas stations superimposed on a map according to an alternate exemplary embodiment of the present invention.

FIG. 3 depicts an exemplary screen shot of fuel prices data according to an exemplary embodiment of the present invention. With reference thereto, distance and direction to each station is displayed. Unlike a more cumbersome navigation system, here, for example, no detailed routing to a given gas station need be provided, just rough directional information. FIG. 3A depicts an alternate exemplary embodiment, where the oil company logo is displayed at the far left, and the relative location of each listed gas station can be displayed overlaid on a map.

In exemplary embodiments of the present invention there can be provided an option to sort stations by price or distance to vehicle's then current position. In exemplary embodiments of the present invention such a fuel price data service can be implemented, for example, with minor or no modification required to existing fuel price data feeds used in connection with navigation systems.

Figure 4:
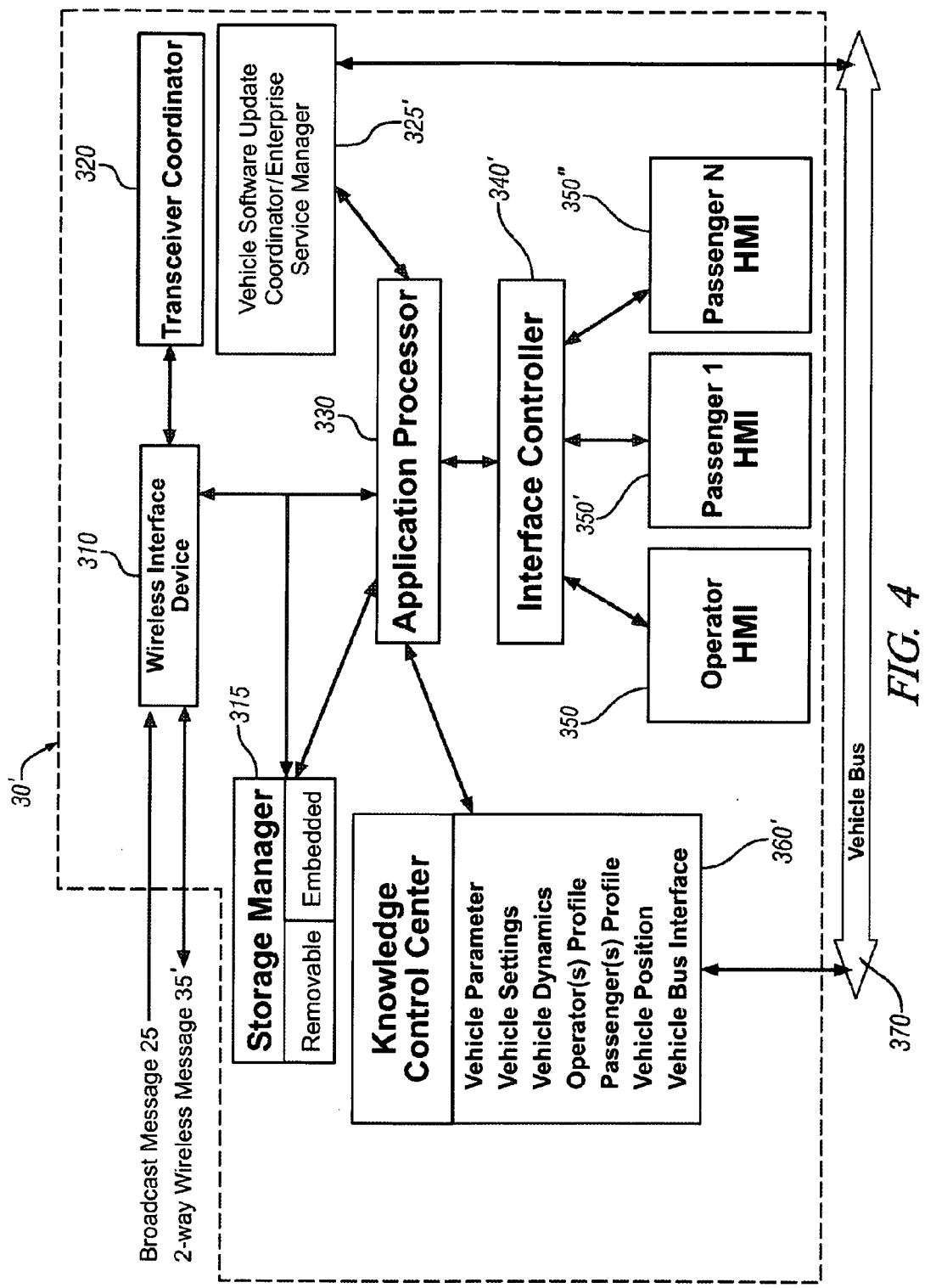
FIG. 4 is a screen shot of movie listings according to an exemplary embodiment of the present invention.
Figure 4A:
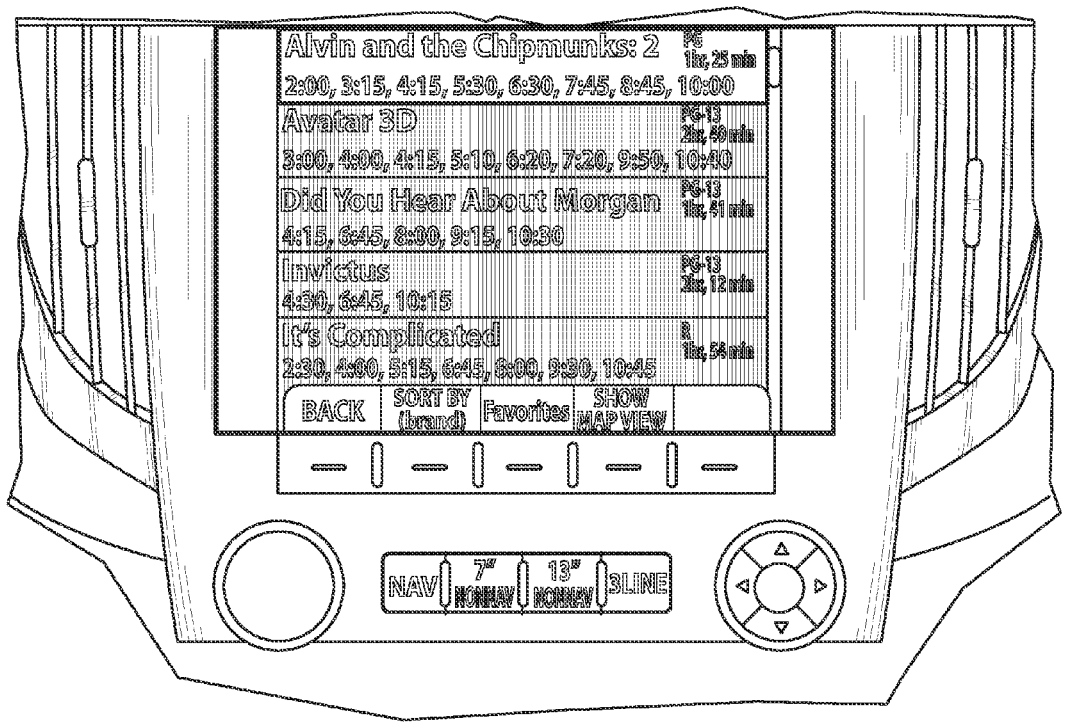
FIG. 4A is a screen shot of an alternative movie listings information screen according to an alternate exemplary embodiment of the present invention.

FIG. 4 depicts an exemplary screen shot of local movie listings according to an exemplary embodiment of the present invention, and FIG. 4A depicts a screen shot of an alternate exemplary embodiment of this data service. In such exemplary embodiments, both distance and direction to theater can be displayed in the same manner shown for fueling stations in FIGS. 3 and 3A.

In exemplary embodiments of the present invention, a non-nav based movie information service can be based on existing data feeds used in connection with navigation-based systems.

In exemplary embodiments of the present invention there can be provided an option to sort theaters by movie, theater, or proximity to then current location of vehicle. In exemplary embodiments of the present invention such a fuel price data service can be based on, and can be implemented, for example, with minor or no modification required to existing movie information data feeds used in connection with navigation-based systems. Thus, such exemplary non-nav based movie information services can be, for example, essentially identical to similar navigation system based movie information services.

Figure 5:
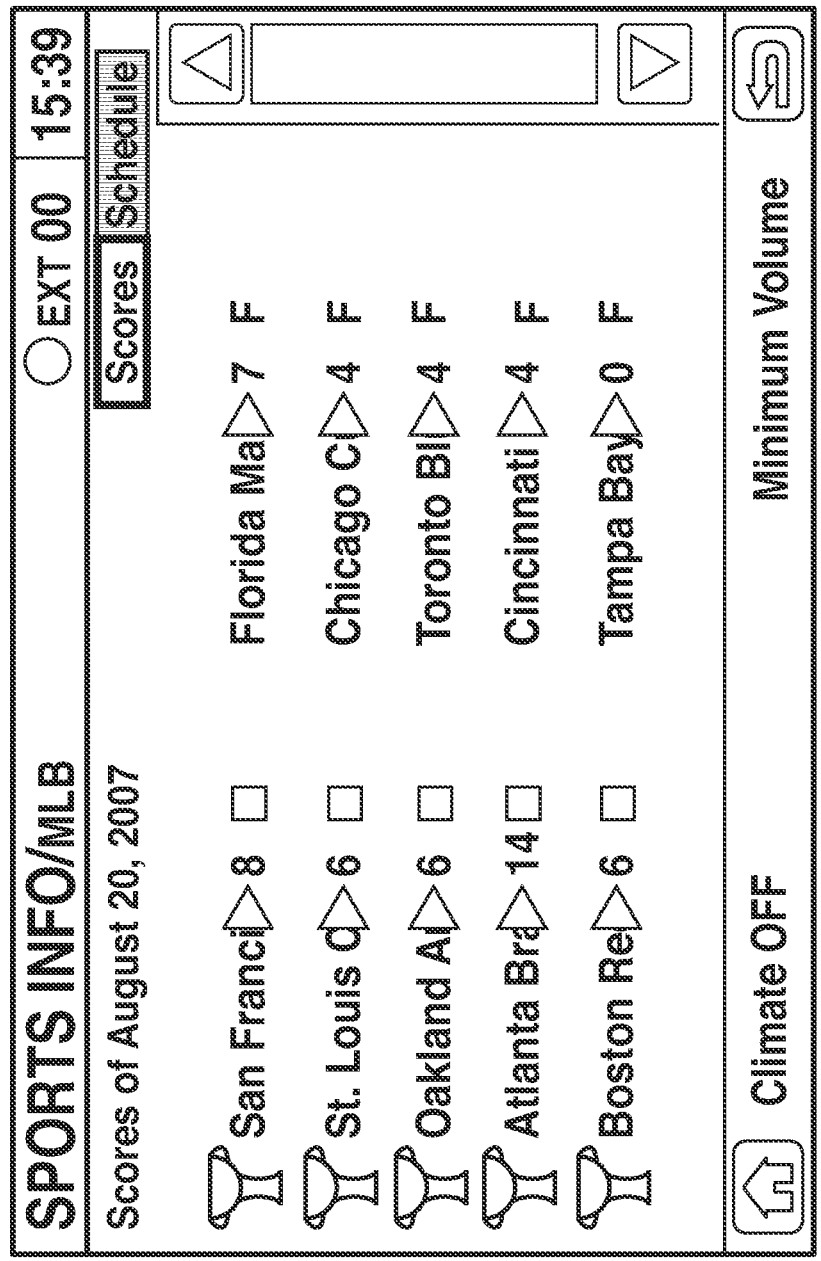
FIG. 5 is a screen shot of sports scores according to an exemplary embodiment of the present invention.
Figure 5A:
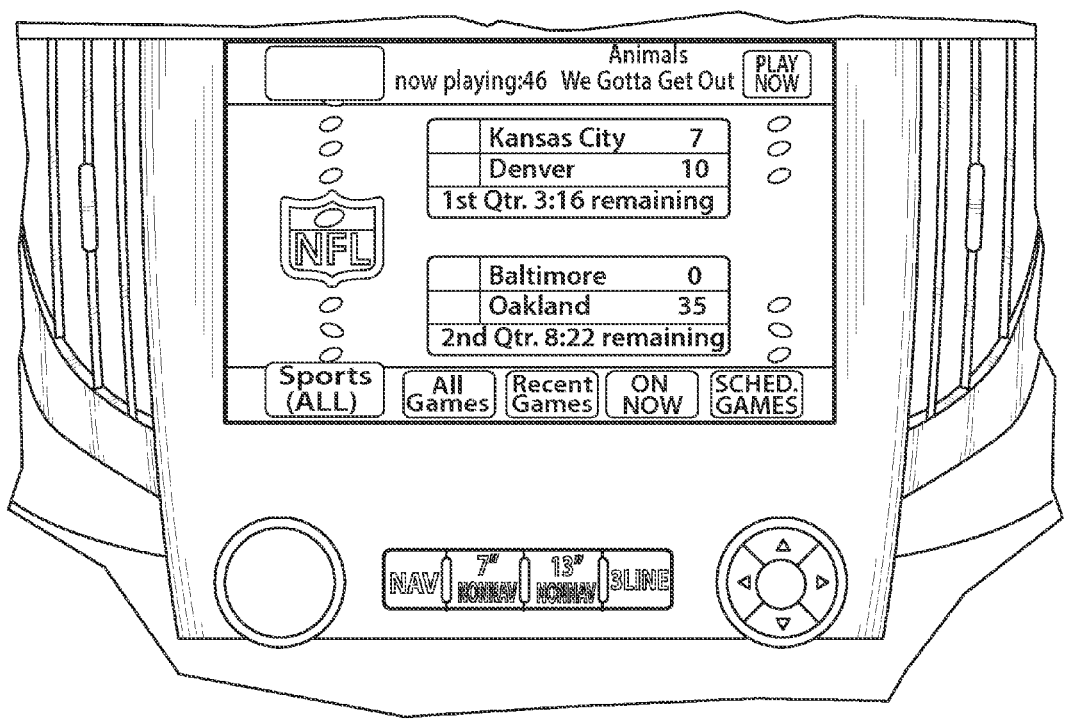
FIG. 5A is a screen shot of an alternative sports scores information screen according to an alternate exemplary embodiment of the present invention.

FIG. 5 depicts an exemplary screen shot of a sports scores data service according to exemplary embodiments of the present invention. FIG. 5A depicts an alternate exemplary screen shot of this service according to alternate exemplary embodiments of the present invention. In exemplary embodiments of the present invention, a non-nav based sports score information service can be based on existing data feeds used in connection with navigation-based systems. Additionally, in exemplary embodiments of the present invention, a non-nav based sports score service can be based on, and provided with no or minor modification to existing sports information data feeds used by SDARS providers in connection with navigation-based systems. Thus, no modifications are required to existing in-vehicle sports data human machine interfaces ("HMI"), and such an exemplary non-nav based sports score service can be, for example, essentially identical to similar navigation-based sports score services, such as, as noted above, the Sirius Travel Link® service.

The description above is intended by way of example only and is not intended to limit the present invention in any way except as set forth in the following claims. For example, although various exemplary embodiments have been described with respect to a satellite digital audio radio service, the embodiments and contemplated claim scope are equally applicable to other satellite and land based digital audio systems such as, for example, broadcast systems such as HD Radio, DAB, ATSC Mobile, and MediaFlo, as well as two way systems such as, for example, ICO satellite/terrestrial as well as 4G LTE or WiMAX.

Additionally, messaging formats are not limited to TMC, but can include other formats such as, for example, TPEG or other proprietary or nonproprietary formats. Decoders used in exemplary embodiments of the present invention are not limited to Alert-C decoders, but can, for example, be implemented using any other standard or proprietary decoder format. Although the described exemplary embodiments primarily entail head unit applications in automobiles, such embodiments can also include any electronic device having a screen display. Data can be overlaid on roads on a standard map or a representative road system or on custom maps such as, for example, a given city's subway map.

In alternative exemplary embodiments, certain TMC location codes can be removed or certain TMC location codes can be added to smooth the colored flow information. It is noted that in some exemplary embodiments GPS can be used to automatically display the appropriate map, market, or correct/relevant data. Embodiments herein can be also be implemented as a screen-less non-navigation system (with or without GPS).

What is claimed:

1. A non-navigation based system for providing data services in a mobile environment, comprising:
   a Satellite Digital Audio Radio Service ("SDARS") receiver, said receiver arranged to receive one or more data feeds in addition to audio content via a broadcast;
   a location determination mechanism for determining a current location of said SDARS receiver in said mobile environment;
   and
   a display integrated within a head unit of said SDARS receiver for graphically displaying data from said one or more received data feeds corresponding to the current location, said display also used to display textual or graphic data associated with an audio program of said SDARS;
   wherein the data corresponding to the current location includes weather service data and at least one of fuel service data and movie listings data,
   wherein, in operation, the SDARS receiver decodes data from said one or more data feeds and selectively displays said data corresponding to the current location on said display, without first storing said data in storage,
   wherein upon signaling by a user, said data is sorted by at least one of proximity to the current location and provider name or affiliation, and redisplayed according to the chosen sorting criterion, and
   wherein said weather service data is displayed as overlaid on one or more static maps.

2. The system of claim 1, wherein the data corresponding to the current location further includes at least one of, weather service data, and sports score data.

3. The system of claim 2, wherein the weather service data is super-imposed onto a predetermined number of static map tiles.

4. The system of claim 3, wherein a user can traverse locations or zoom-in or zoom-out using a number of tiles of static maps and wherein the weather service data is correspondingly overlaid over the tiles as they are traversed.

5. The system of claim 3, wherein a user can select alternate weather markets from a drop down menu, speech recognition, or other user friendly input method.

6. The system of claim 1, wherein the location determination mechanism is a global positioning service receiver or a cellular receiver using one or more among time of arrival, phase of arrival, strength of arrival, frequency of arrival, time difference of arrival, and multiangulation.

7. The system of claim 1, wherein the fuel service data provides data for a number of fueling stations within a predetermined vicinity of the current location and further provides heading information for the number of fueling stations within the predetermined vicinity.

8. The system of claim 1, wherein the data corresponding to the current location includes at least two of: weather service data, fuel data, movie listings data, and sports score data.

9. A method for providing data services in a mobile environment without a navigation system, comprising:
   decoding a Satellite Digital Audio Radio Service ("SDARS") broadcast signal including one or more data feeds in addition to audio content using an SDARS receiver;
   determining a current location of the SDARS receiver in said mobile environment;
   decoding data from said one or more data feeds, including weather service data and at least one of fuel service and movie data listings;
   selectively graphically displaying said decoded data corresponding to the current location on a display integrated in a head unit of said receiver without first storing said data in storage, said display also used to display textual or graphic data associated with an audio program of said SDARS, and upon receipt of a user signal, sorting such data by at least one of proximity to the current location and provider name or affiliation, and redisplaying the data according to the chosen sorting criterion, wherein said weather service data is displayed as overlaid on one or more static maps.

10. The method of claim 9, wherein the data corresponding to the current location further includes at least one of weather service data, and sports score data.

11. The method of claim 10, wherein the weather service data is super-imposed onto a predetermined number of static map tiles.

12. The method of claim 11, wherein a user can traverse locations or zoom-in or zoom-out using a number of tiles of static maps and wherein the weather service data is correspondingly overlaid over the tiles as they are traversed.

13. The method of claim 11, wherein a user can select alternate weather markets from a drop down menu, speech recognition, or other user friendly input method.

14. The method of claim 9, wherein the current location is determined using a global positioning service receiver or a cellular receiver using one or more among time of arrival, phase of arrival, strength of arrival, frequency of arrival, time difference of arrival, and multiangulation, or any combination thereof.

15. The method of claim 9, wherein the fuel service data provides data for a number of fueling stations within a predetermined vicinity of the current location and further provides heading information for the number of fueling stations within the predetermined vicinity.

16. The method of claim 9, wherein the data corresponding to the current location is at least two of weather service data, fuel data, movie listings data, and sports score data.

17. A system for providing data services in a mobile environment without a navigation system, comprising:

a Satellite Digital Audio Radio Service ("SDARS") receiver, said receiver arranged to receive one or more data feeds in addition to audio content via a broadcast;

a location determination mechanism for determining a current location of said SDARS receiver in said mobile environment; and a presentation device integrated within a head unit of said SDARS receiver for graphically presenting data from said one or more data feeds corresponding to the current location, said presentation device also used to display textual or graphic data associated with an audio program of said SDARS; and wherein the data corresponding to the current location includes weather service data and at least one of fuel service data and movie listings data, wherein, in operation, the SDARS receiver decodes data from said one or more data feeds and selectively displays said data corresponding to the current location from said one or more data feeds on said display, without first storing said data in storage, and wherein upon signaling by a user, said data is sorted by at least one of proximity to the current location and provider name or affiliation, and represented according to the chosen sorting criterion, and wherein said weather service data is displayed as overlaid on one or more static maps.

18. The system of claim 17, wherein the presentation device comprises an audio speaker or a screen display.

19. The system of claim 17, wherein the data corresponding to the current location includes at least two of: weather service data, fuel data, movie listings data, and sports score data.

* * * * *